INVENTOR.
ROBERT C. BULLENE
BY *Moody & Anderson*
AGENTS

Dec. 27, 1966    R. C. BULLENE    3,295,037
ELECTRONIC BI-DIRECTIONAL D.C. MOTOR BRAKING
Filed Sept. 9, 1964    2 Sheets-Sheet 2

INVENTOR.
ROBERT C. BULLENE
BY Moody & Anderson
AGENTS

United States Patent Office

3,295,037
Patented Dec. 27, 1966

3,295,037
ELECTRONIC BI-DIRECTIONAL D.C.
MOTOR BRAKING
Robert C. Bullene, Marion, Iowa, assignor to Collins Radio Company, Cedar Rapids, Iowa, a corporation of Iowa
Filed Sept. 9, 1964, Ser. No. 395,266
5 Claims. (Cl. 318—261)

This invention relates generally to control of direct current motors and more particularly to a means for bidirectional control of high speed D.C. motors having provision for electronic braking whereby the rotation of the motor may be stopped in a minimum of time upon initiation of a braking "command."

Direct current motors may be advantageously employed in the automatic tuning of electronic components because of the advantages of high speed operation. In systems such as, for example, an automatic antenna tuning system, it may ofttimes be desirable that the phasing and loading requirements affecting the tuning be attained in a minimum of time. High speed tuning infers high speed motor operation to drive the tuned elements. However, the high speed motor presents a problem of inertia and the operation of such high speed tuning circuits may be limited by the extent to which the control circuit is able to brake the high speed motor sufficiently fast to stop the tuning process at a desired point. Thus, while the high speed operation may rapidly insert a given tuning parameter, the inertia of the motor may cause the system to "coast" past the desired stopping point. Through servo techniques, electronic impulses in the form of a stop "command" might be generated in response to, for example, sufficient turns of a coil being shorted in response to a predetermined motor rotation to attain a desired phase relationship. If any appreciable time is consumed between the initiation of the stop "command" and the actual time at which the motor ceases to rotate, the system will have "coasted" past the desired point. It is desirable therefore, and ofttimes imperative, that the braking action of high speed drive motors be accomplished in a minimum of time upon the initiation of a stop "command."

Stopping a motor instantaneously obviously violates a fundamental law of physics. Realizing this, prior art approaches concerned with stopping high speed motors have incorporated mechanical brakes energized by an electrical field or have incorporated the principle of energizing a relay which removes the motor drive voltage and places a shunt across the motor terminals to dissipate the energy therein. Both of these prior art means consumes precious hundreds of milliseconds in the braking process that may allow the motor to coast past the desired stopping point.

The present invention has as an object therefor the provision of an electronic braking circuit for a high speed D.C. motor which takes action a few microseconds after a stop "command" is received.

A further object of the present invention is the provision of a high speed electronic braking circuit which may be utilized to drive and stop a motor in either direction by means which stop the motor nearly instantaneously upon the initiation of the stop "command."

The present invention is featured in the provision of incorporating in a motor drive control circuitry silicon controlled rectifiers responsive to control gates which form the "command" signals and so connecting the circuit with a high speed D.C. motor as to selectively and nearly instantaneously short the motor field to effect a stop action which reduces motor coast to a minimum. These and other features and objects of the present invention will become apparent upon reading the following description with reference to the accompanying drawings in which.

Figure 1:
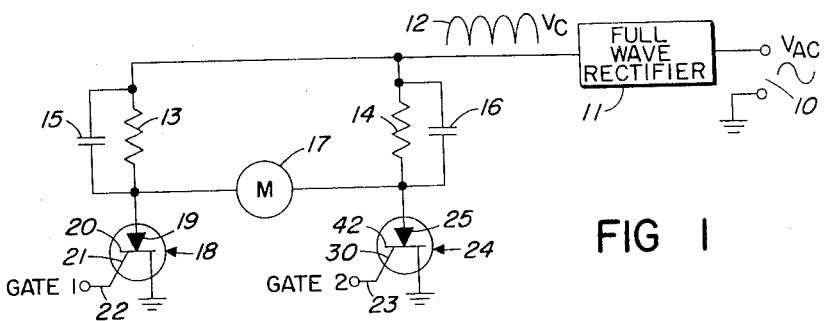
FIGURE 1 is a schematic embodiment of the bidirectional D.C. motor brake circuit in accordance with the invention.

An embodiment of the control circuitry of the invention is shown schematically in FIGURE 1. Motor 17 is a high speed D.C. motor conventionally represented as a two terminal device. Motor 17 is connected in circuit with a pair of voltage controlled rectifiers 18 and 24 and resistors 13 and 14 so as to form, in conjunction with a driving voltage source 12, a bridge-like arrangement. Motor 17 is connected across the junctions between resistor 13 and silicon controlled rectifier 18 and resistor 14 and silicon controlled rectifier 24, respectively. Resistors 13 and 14 are high power resistors, capable of dissipating the power provided by the voltage source 12.

The voltage source 12 is in the form of a full wave rectified waveform which may be developed from applying a source of alternating voltage 10 through full wave rectifier 11 such that the drive voltage 12, as referenced to common ground, is in the form of a positive full wave rectified voltage, depicted as $V_c$. It is noted that the terminals of motor 17 are connected to the anodes 19 and 25 of silicon controlled rectifiers 18 and 24 respectively, while the cathodes 20 and 42 of the silicon controlled rectifiers are returned to common ground.

The supply voltage $V_c$ is seen to be an undulating positive voltage which periodically forward biases the anode to cathode junctions of the silicon controlled rectifiers, with the bias voltage dropping to substantially zero at the successive cusps or zero points of the full wave rectified waveform, $V_c$.

The control action of the circuit is based upon the gating characteristics of the silicon controlled rectifiers 18 and 24. Gate electrodes 21 and 30 of these rectifiers provide a means to selectively gate the silicon controlled rectifiers to conductive states, the impedance of the anode to cathode junctions thereof thereby being selectively variable from a very high impedance to substantially a short circuit upon the silicon controlled rectifier being "fired."

Silicon controlled rectifiers fire at the instant that a positive control voltage is applied to the gate electrode (with respect to the cathode) when the anode of the controlled rectifier is positive with respect to the cathode. The rectifier continues to fire as long as the anode remains positive with respect to the cathode, and ceases to fire when the anode is no longer positive. The silicon controlled rectifier does not require the continued presence of the positive controlled voltage on the gate electrode to maintain the firing. Because of this characteristic of the silicon controlled rectifier, the motor 17 is driven by the full wave rectified drive voltage 12 which may be considered as a positive pulsating D.C. voltage. This pulsating voltage, which periodically falls to zero, is necessary in order that the silicon controlled rectifiers may be selectively fired at any desired period of time. This operational characteristic of the rectifier elements will be further considered in detail with respect to operating waveforms. It will suffice at the present to consider that either one or both of the silicon controlled rectifiers 18 and 24 of FIGURE 1 may be fired when a positive voltage with respect to common ground is applied to the rectifier gate element, and that the rectifier will continue to be conductive or "fired" as long as the anode of the element remain positive with respect to the cathode.

Figure 2:
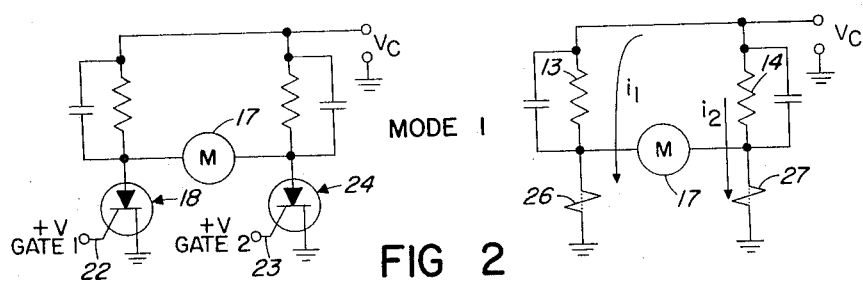
FIGURES 2, 3 and 4 are functional schematic diagrams of three distinct modes which define the operational aspects of the embodiment of FIGURE 1.
Figure 3:
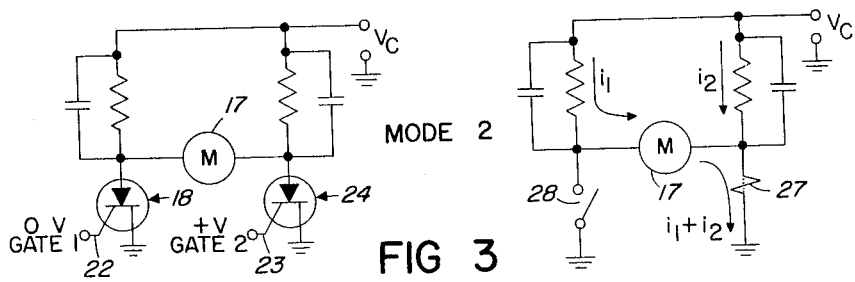
Figure 4:
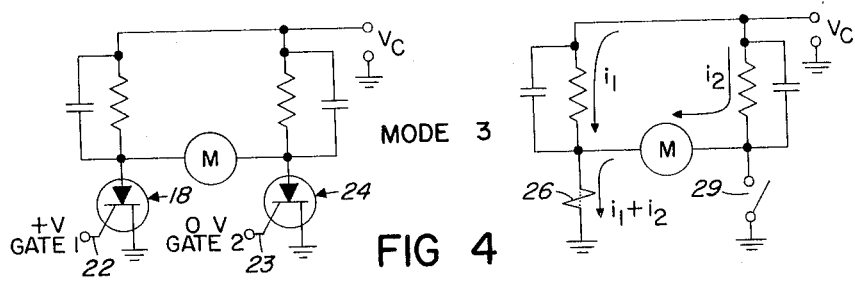

The operation of the circuit may best be understood by referring to FIGURES 2, 3 and 4 which define three operational modes defined by the effect of a positive gate voltage being applied to both silicon controlled rectifier gates, and to one or the other of the gates, respectively.

FIGURE 2 represents a positive gate voltage (+V) being applied to each of the gates 22 and 23 associated with the controlled rectifiers 18 and 24. This mode is defined as the stop or braking mode wherein both of the controlled rectifiers are conducting and each accordingly represents an extremely low impedance between the associated terminal of the motor and common ground. FIGURE 2, therefore, represents functionally the control circuit under the condition of both gates being applied wherein each of the silicon controlled rectifiers is represented as an extremely low impedance depicted as resistors 26 and 27. For all practical purposes, the resistors 26 and 27 are essentially a short circuit, the resistors representing the respective saturation resistances of the silicon controlled rectifiers. In the stop mode depicted in FIGURE 2, the motor 17 has both terminals connected to ground through a very small resistance and thus the motor terminals are effectively short-circuited. In this mode, the power from the control source $V_c$ is dissipated in resistors 13 and 14 by the development of two equal current paths $i_1$ and $i_2$.

Mode 2 of the operating characteristic is depicted in FIGURE 3 wherein the gating voltage previously applied to gate 22 of silicon controlled rectifier 18 is removed. FIGURE 3 then functionally represents the control circuitry as including an open switch 28 to represent the nonconducting silicon controlled rectifier 18, while representing silicon controlled rectifier 24 as the very low saturation resistance of the element (resistor 27). Under this condition, the motor 17 has a current flowing through it from left to right as depicted by current $i_1$. This direction of current flow then effects rotation of the motor 17 in a first direction.

The third operating mode is depicted in FIGURE 4 wherein the gating voltage applied to silicon controlled rectifier 24 is removed while that applied to gate 22 of the silicon controlled rectifier 18 is retained. FIGURE 4 represents the resulting control circuitry wherein the nonconducting rectifier 24 is represented by an open switch 29 while conducting rectifier 18 is represented by its low saturation resistance 26. In this mode it is noted that a current $i_2$ flows through the motor terminals from right to left, thus effecting a reversal of motor rotation from that realized in FIGURE 3.

It is to be noted that the bidirectional control provided by the invention is that of causing the motor to rotate in either direction, followed by a braking or stop mode wherein the motor is caused to stop in a minimum of time. Thus, in operation, the quiescent condition would be that depicted and described in FIGURE 2 wherein the motor terminal is effectively short-circuited and upon command in the form of a gate being applied to one or the other of the gate electrodes, motor rotation may be effected (modes 2 and 3). It is noted, therefore, that to go from either rotational mode to the quiescent or stop mode, the circuitry necessitates but the reapplication of a positive gate voltage which was previously removed. Upon the reapplication of the positive gate voltage to the nonconducting one of the silicon controlled rectifiers braking action is effected by a nearly instantaneous shorting of the motor terminals.

Figure 7:
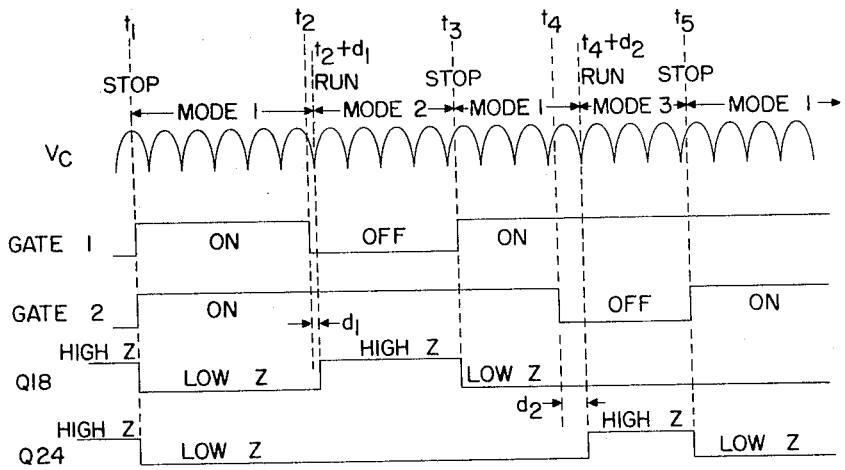
FIGURE 7 is a diagrammatic representation of waveforms depicting the operating modes of the invention.

Reference is made to the operational waveforms of FIGURE 7 wherein supply voltage $V_c$ is depicted as the full wave rectifier voltage which is continuously applied across the anode to cathode junctions of the silicon controlled rectifiers so as to forward bias the rectifiers. The time $t_1$ in FIGURE 7 represents the initiation of a stop mode wherein positive voltages are applied to both gates such that both silicon controlled rectifiers are conducting and represent essentially a short circuit. During this mode the impedance of the silicon controlled rectifiers are each indicated as a low impedance. The motor terminals are shorted and the motor is stopped. At a time $t_2$, gate 1 to silicon controlled rectifiers 18 is removed with the gate 2 to silicon controlled rectifiers 24 being maintained. In accordance with the operating characteristic of the rectifying element, the controlled rectifier 18 ceases to conduct at a time $d_1$ after the time $t_2$ which corresponds to the first instant at which the supply voltage $V_c$ goes to zero subsequent to the removal of gate 1. Thus at $(t_2+d_1)$, silicon controlled rectifier 18 reverts to a nonconductive or high impedance state such that mode 2 (FIGURE 3) is initiated and the motor runs in a first direction. It should be emphasized here that when going from the stop mode 1 to either of the modes 2 or 3, a delay in motor rotation may be effected since the silicon controlled rectifier continues to fire as long as its anode is positive with respect to its cathode even though the gate mode to the circuit may have been removed. The object of the invention, however, is that of effecting a nearly instantaneous stop action, that is, when a desired amount of motor rotation has been effected, the motor is to be stopped as quickly as mechanically possible and does not coast past the desired point. Thus, a delay in the rotation modes of the motor may be realized depending upon the relative time occurrence of the removal of a gate pulse and the waveform of the supply voltage $V_c$. However, upon the subsequent reapplication of the gate voltage, it will be noted that a stop action is instantaneously effected.

Thus, with further reference to FIGURE 7, mode 2 represents a rotation in a given direction until such a time as gate 1 on rectifier 18 is again applied, whereupon the impedance of each of the rectifiers is again a low impedance and at time $t_3$ the motor is stopped abruptly at the instant of the stop command (the reapplication of the gate 1 voltage).

The waveforms further depict the initiation of a mode 3 operation at time $t_4$ at which time the gate 2 voltage to silicon controlled rectifier 24 is removed with the continuance of the gate 1 voltage on rectifier 18. Here again, the rotation mode 3 is not effected until a time $d_2$ after the time $t_4$ corresponding to the return of the supply voltage $V_c$ to zero for the first time after the initiation of the command. Finally, FIGURE 7 represents the reinitiation of the stop mode 1 at time $t_5$ by the reapplication of gate 2 voltage whereupon both the silicon controlled rectifiers again represent a low impedance and the stop action is instantaneously effected.

Reference to waveforms of FIGURE 7 then illustrates that the initiation of a stop mode at the termination of rotational modes 2 or 3 is instantaneously effected, while the initiation of the rotation modes 2 or 3, after a stop mode 1, may not be realized immediately due to the characteristics of the silicon controlled rectifier. It is apparent that the maximum delay which might be encountered in the initiation of a rotation mode is that defined by one-half cycle of the alternating current voltage $V_{ac}$ of FIGURE 1, which, in the case of a 400 cycle waveform, would define a maximum delay of 1¼ milliseconds. As above mentioned, the delay in the initiation of a rotation mode may well be tolerated in an actual application, the important operational feature being the immediate initiation of a stop mode in response to a stop command. It may further be noted that even though a maximum delay of 1¼ milliseconds may be encountered in initiating a rotation mode that this time is minimal when compared to the several milliseconds necessary to effect motor control utilizing relays as controlling devices.

The time to fire a silicon controlled rectifier is in the order of a microsecond maximum, and thus the initiation of a stop mode is nearly instantaneous. In this respect, however, the characteristic of the silicon controlled rectifier may, depending upon the relative time occurrence between the application of a gate and the waveform of the supply voltage $V_c$, introduce a slight delay, since the silicon controlled rectifier, in order to fire, must have its anode positively biased at the time of the application of a positive gate voltage. Thus, should the application of either gate 1 or 2 be made so as to coincide with a zero point or cusp of the supply waveform $V_c$, the actual response to the command may not be effected until a few microseconds later when the waveform $V_c$ has attained a predetermined positive value. This effect is minimal, however, since the rise time of waveform $V_c$ may be made to be steep so as to minimize the time at which the waveform $V_c$ is beneath the predetermined positive value. In an actual application, the possible delay in initiation of a stop mode due to coincidence or semi-coincidence between the application of the gate and the zero cusp of the supply waveform may amount to 25 or 30 microseconds. It is to be realized that this period of time is still extremely minimal when compared to the hundreds of milliseconds necessary to effect motor braking in known control circuitry.

Figure 6:
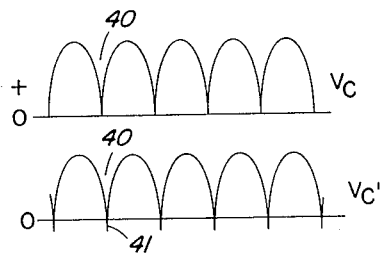
FIGURE 6 is a diagrammatic representation of the supply voltage utilized to drive the motor.

In a preferred embodiment each of the resistors 13 and 14 might be shunted with a capacitor such as capacitors 15 and 16 of FIGURE 1. The addition of the capacitors 15 and 16 provides a time constant in conjunction with resistors 13 and 14 which does not allow the voltage actually applied across the silicon controlled rectifiers to follow the supply waveform $V_c$. Due to a slight negative capacitance charge, the actual waveform applied to the silicon controlled rectifiers includes a slight negative portion 41 at the waveform cusp positions as indicated in FIGURE 6. This insures that the biasing voltage on the silicon controlled rectifier is removed for approximately 25–30 microseconds to insure that the elements return to the nonconductive state and are thus readied for a repeat gating during the ensuing time period.

Figure 5:
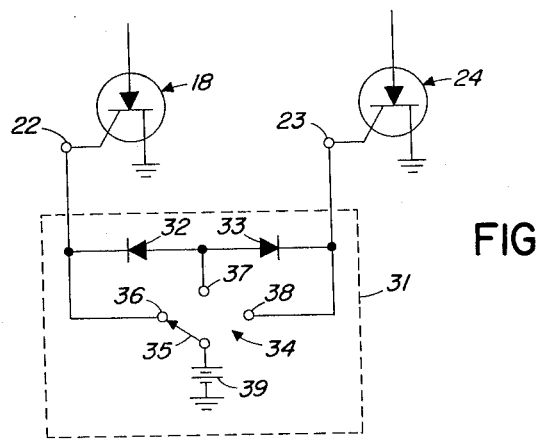
FIGURE 5 is a schematic representation of a type of gating circuit which may be employed in conjunction with the embodiment of FIGURE 1.

The above described control is seen to be based upon the application of positive gate voltages to the control gates of the silicon controlled rectifiers. FIGURE 5 represents a simplified arrangement by which control of the motor 17 may be effected in accordance with the invention. The gates 22 and 23 of the silicon controlled rectifiers are connected to a control circuitry 31 in the form of a three position switch 34, by means of which a positive D.C. voltage source 39 may be selectively connected to one or the other, or both, of the gate electrodes 22 and 23. Diodes 32 and 33 are connected to the center switch position as isolation elements such that the switch arm 35, when connected to the contact 36, applies the positive source 39 to the gate 22; when connected to contact 37 applies the positive source 39 to both of the gates 22 and 23, and, when connected to the contact 38, connects positive source 39 only to gate 23. As depicted in FIGURE 5, illustrated switch position effects the aforedescribed mode 3 wherein the silicon controlled rectifier 18 represents a low impedance. With the switch arm 35 connected to the center contact 37, the stop mode 1 is effected with both of the silicon controlled rectifiers representing a low impedance. With the switch arm 35 connected to the contact 38, silicon controlled rectifier 24 is rendered conductive and mode 1 is effected.

With the gating control circuitry 31 arrangement of FIGURE 5, it is noted that the necessary gating applications may be selectively effected to run the motor in either of two directions and, upon initiation of either one of the rotation modes, 2 or 3, the motor may be nearly instantaneously stopped by positioning the switch 34 to the center position. It is anticipated, however, that a more sophisticated gating control circuit may be employed to effect the operational modes. For example, the control is seen to be affected by the presence or absence of positive gate voltages and thus the control circuit 31 of FIGURE 5 might comprise any one of a number of sophisticated circuit arrangements operating in conjunction with a servo system under the control of motor 17 to develop, through appropriate logic, the presence of the two gate voltages in the proper permutations to effect servo positioning in a bidirectional sense and assure instantaneous stopping of the motor upon command.

Although the present invention has been described with respect to a particular embodiment thereof, it is not to be so limited as changes may be made therein which fall within the scope of the invention as defined by the appended claims.

I claim:

1. A bidirectional drive and braking system for a direct current motor comprising a source of full wave rectified alternating current voltage, a first resistive member and a first silicon controlled rectifier element respectively serially connected across said voltage source, a second resistive member and a second silicon controlled rectifier element respectively serially connected across said voltage source, said direct current motor having a first terminal connected between the junction of said first resistive member and said first silicon controlled rectifier and a second terminal connected to the junction between said second resistive member and said second silicon controlled rectifier, and control means associated with each of said silicon controlled rectifier to render conductive selected ones thereof, said control means affecting a first operational mode defined by both of said silicon controlled rectifiers being rendered conductive, a second operational mode defined by only said first silicon controlled rectifier being rendered conductive, and a third operational mode characterized by only said second silicon controlled rectifier being rendered conductive.

2. A system as defined in claim 1 wherein said control means comprises a source of positive bias voltage and switching means for selectively applying said bias voltage to the gate electrodes associated with said first and second silicon controlled rectifiers.

3. A system as defined in claim 2 further comprising first and second capacitors respectively shunting said first and second resistive members.

4. A system as defined in claim 1 wherein said control means comprises means for selectively applying a gating signal to selected ones of said first and second silicon controlled rectifiers, said silicon controlled rectifiers being rendered conductive substantially simultaneously in response to said gating signal being applied thereto.

5. A system as defined in claim 1 wherein said silicon controlled rectifiers are so polarized with respect to said source of half wave rectified voltage as to be forward biased thereby.

References Cited by the Examiner
UNITED STATES PATENTS 2,965,827 12/1960 Hohne _____ 318—80
3,176,159 3/1965 Laishley _____ 307—88.5
3,184,670 4/1965 Reynolds.

ORIS L. RADER, *Primary Examiner.*

B. DOBECK, *Assistant Examiner.*